May 13, 1958

R. H. GEORGE 2,834,638

AIR BRAKE SYSTEMS FOR AUTOMOTIVE VEHICLES

Filed Dec. 31, 1954

INVENTOR
Robert H. George
BY
Jas. C. Wobersmith
ATTORNEY

May 13, 1958 R. H. GEORGE 2,834,638
AIR BRAKE SYSTEMS FOR AUTOMOTIVE VEHICLES
Filed Dec. 31, 1954 2 Sheets-Sheet 2
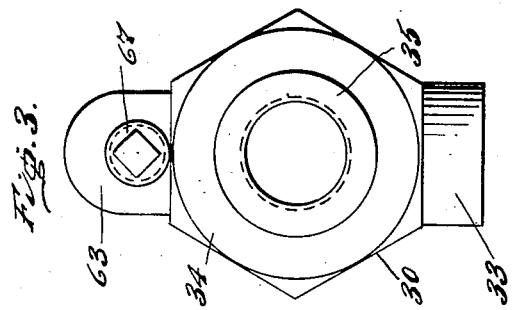
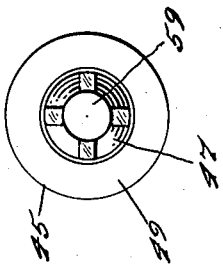
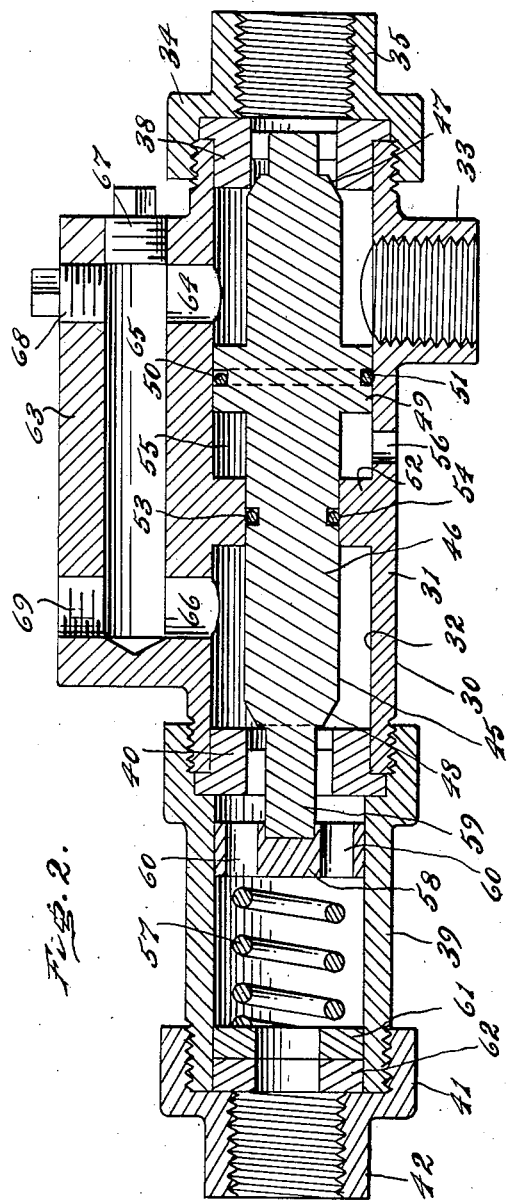
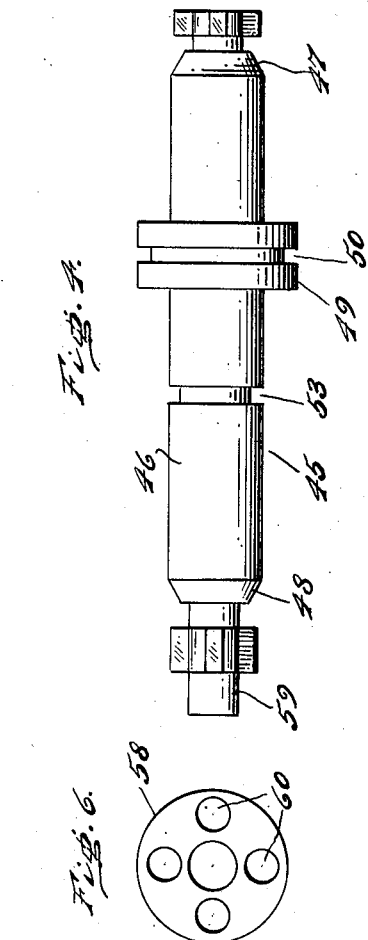
INVENTOR
Robert H. George
BY
ATTORNEY

United States Patent Office 2,834,638
Patented May 13, 1958

2,834,638

AIR BRAKE SYSTEMS FOR AUTOMOTIVE VEHICLES

Robert H. George, Melrose Park, Pa.

Application December 31, 1954, Serial No. 479,076

4 Claims. (Cl. 303—85)

This invention relates to air brake systems for automotive vehicles, and it relates more particularly to air brake systems particularly adaptable for use on heavy vehicles such as trucks, buses, tractors, and tractor trailers.

In the use of heavy automotive vehicles many wrecks are attributed to alleged brake failures. However, it appears that a large number of such wrecks are caused by the failure of the drivers to use the brake systems properly, and many of such accidents occur on down grades while the engines, as well as the compressors, are idling.

It is, of course, well known that when a compressor in a heavy vehicle air brake system is idling, the supply of compressed air needed for proper braking is not ordinarily maintained in the required amount, and it is equally well known that when a truck or tractor provided with an air brake system has been standing for some time, it frequently happens that, due to leakage in the system, there is no air immediately available for braking purposes, and accidents frequently occur through failure of the operators to recognize these conditions.

It is a common practice for the operators of heavy vehicles, particularly on down grades, to indulge in a practice commonly called "fanning" which consists in making a number of light brake applications in succession, the effect of which is to reduce the available air pressure in the reservoir tanks to a point where there is no longer sufficient air under the requisite pressure available to operate the brakes to properly control the movement of the vehicles.

The normal air pressure commonly used in automotive vehicle practice has been from about 85 to 105 pounds per square inch, but as the vehicle loads are constantly becoming greater, there is a tendency for the operators to adjust the governor valves upward to about 100 to 120 pounds working pressure.

Some time ago the Interstate Commerce Commission promulgated a rule that all automotive vehicles made after June 30, 1953, equipped with air brakes should be provided with some form of low pressure alarm set to operate whenever the pressure falls below 60 pounds per square inch, and many automotive vehicles are now so equipped.

However, in connection with the use of such low pressure alarm devices there is no provision that in any way governs the operation of the vehicle, and if the operator does not promptly heed and act on the warning, the alarm is of very little value.

Generally, the feeling of the operator is that when the alarm is actuated that there is still some air available so that he can continue on to some point where the necessary correction can be more conveniently made, as it is not generally understood by the operators that for the purpose of obtaining 100 pounds pressure, the air must be compressed from approximately seven times the resulting volume. When a brake application is made with the air in the reservoir at a pressure of 100 pounds, the use of the air in a single brake application will result in a reduction of only four or five pounds, due to the large volume that has been compressed, but when the air in the reservoir has been reduced to about 60 pounds, each brake application will ordinarily reduce the available pressure by more than double the reduction occurring when operating at the higher pressure.

It will therefore be understood that whenever the air in the reservoir tank falls to below 60 pounds pressure the subsequent use of the brakes will quickly reduce the pressure to a point where the brakes will no longer be operative, with the resultant loss of control and danger of collision.

With the foregoing in view, the principal object of the present invention is to provide certain improvements in air brake systems for heavy automotive vehicles whereby the likelihood of accidents due to failure of the brakes to operate properly, by reason of diminution in the pressure in the reservoir tanks, will be reduced to a minimum.

A further object of the present invention is to provide in an air brake system of the character set forth, an arrangement whereby air under sufficient pressure may be by-passed from the compressor for the purpose of directly actuating the brakes when there is little or no air under pressure in the reservoir tanks available for such purpose.

A further object of the present invention is to provide an air brake system of the character aforesaid which will be applicable to automotive vehicles of various types and, particularly, to those in which a detachable trailer is coupled to a tractor.

A further object of the present invention is to provide, in an air brake system of the character aforesaid, a novel form of automatic valve, whereby said air brake systems for heavy automotive vehicles may, with but little change in the general arrangement, be caused to operate safely under the conditions as above set forth.

The nature and characteristic features of the present invention will be more readily understood from the following description taken in connection with the accompanying drawings forming part hereof, in which:

Fig. 2 is a longitudinal central sectional view of an automotive valve device adapted for use in the aforesaid brake system, the same comprising the principal novel portion of the invention;

Fig. 3 is an end elevational view of said valve device;

Fig. 4 is an elevational view of a movable valve member used in the valve device shown in Fig. 2;

Fig. 5 is an end elevation thereof; and

Fig. 6 is an end elevation of a head or guide member forming part of the valve device.

Figure 1:
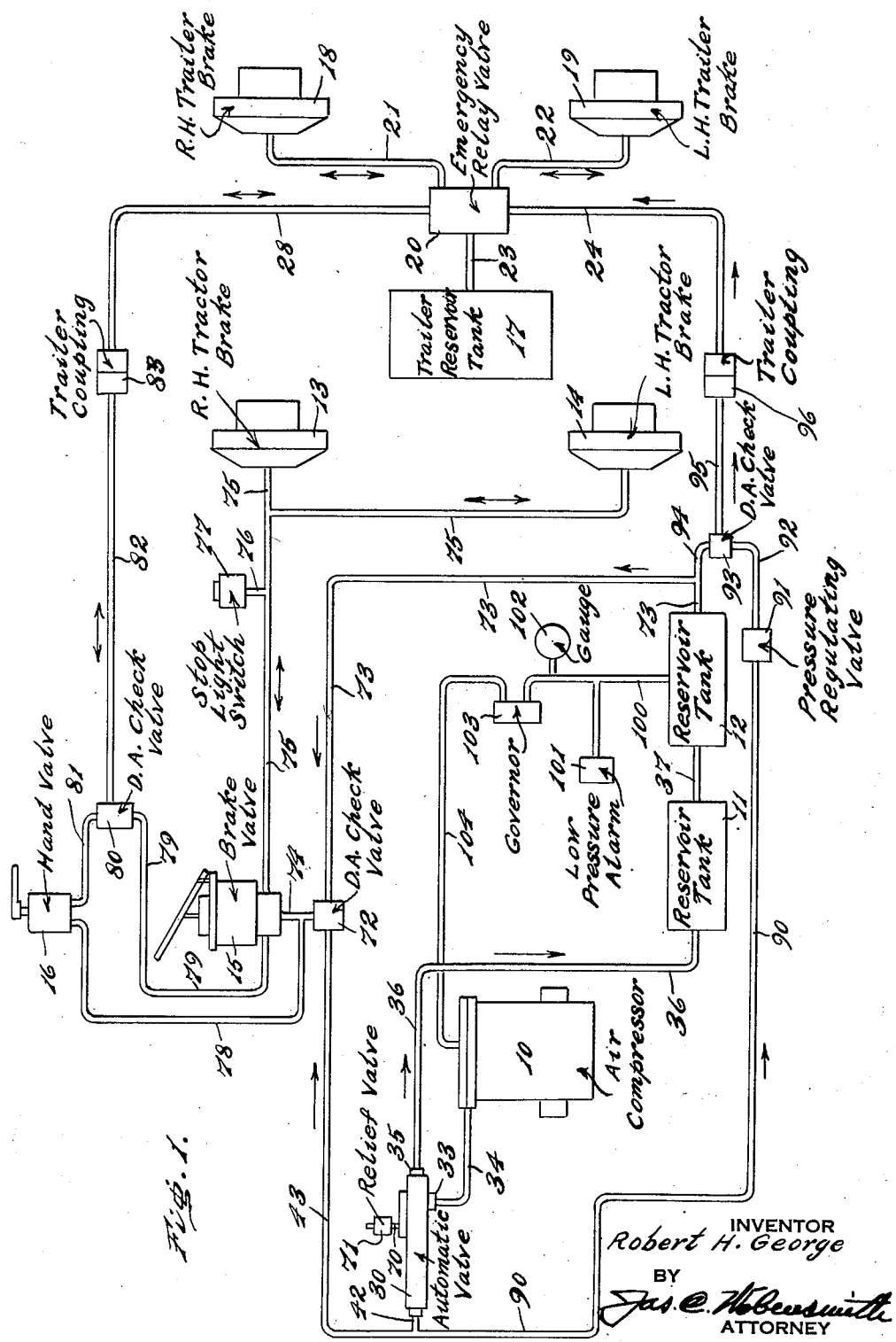
Figure 1 is a diagrammatic view of an air brake system for heavy automotive vehicles embodying the main features of the present invention, the particular arrangement therein shown being applicable to a tractor and trailer type vehicle.

It should, of course, be understood that the description and drawings herein are illustrative merely, and that various modifications and changes may be made in the structure disclosed without departing from the spirit of the invention.

Referring to the drawings, in the particular embodiment of the invention therein shown, the general arrangement of the braking system of the present invention is in many respects similar to the arrangement most commonly used in heavy automotive vehicles, and particularly those in which detachable trailers are employed in connection with tractors, the trailer braking system being coupled to the tractor braking system when the trailer and tractor are used together, and with the exception of the automatic valve employed and hereinafter more fully described, the parts designated may be the same as, or very similar to, those at present in common use in vehicle braking systems.

There is provided, of course, an air compressor or pump 10, and usually a pair of reservoir tanks 11 and 12 for receiving the air which is compressed by said compressor or pump. The tractor wheels (not shown) are provided with right and left hand air operated brakes 13 and 14 to and from which the air passes under the control of the foot operated brake valve 15 or, in the alternative, a hand operated valve 16 which is provided for certain emergency purposes.

In those instances in which a trailer, coupled to the tractor, is used, the trailer is ordinarily provided with a reservoir tank 17 from which the air under pressure may be transmitted to the right and left hand air operated trailer brakes 18 and 19.

The trailer is also provided with a so-called "emergency relay valve" 20 connected in the usual and customary manner to the trailer brakes 18 and 19, by pipe lines 21 and 22, to the reservoir tank 17, by pipe line 23, to the pipe line 24 for supplying the air to the trailer reservoir tank 17 from the main tractor reservoir tanks 11 and 12, and to the pipe line 28 for controlling the passage of the air to and from the trailer reservoir tank 17 for the operation of the brakes 18 and 19.

In air brake systems for heavy vehicles, as heretofore provided, it was customary to connect the air compressor directly to the main reservoir tanks, but in accordance with the present invention there is additionally provided an automatic valve 30, shown in detail in Figs. 2 to 6 of the drawings.

The automatic valve 30 comprises a main housing 31, having an internal cylindrical bore 32, and near one end of the housing 31 there is provided, on one side, an inlet nipple 33, which is connected by pipe line 34 to the air compressor or pump 10.

On the end of the valve housing 31, adjacent the side inlet nipple 33, there is mounted a bonnet 34 having an outlet nipple 35 which is connected by a pipe line 36 to one or the other of the reservoir tanks 11 and 12, which are connected to each other by a pipe line 37.

The bonnet 34 also serves to maintain in position a flanged bushing 38 which provides a valve seat at that end of the housing 31.

At the other end of the housing 31 there is mounted a sleeve like extension 39 of the housing which serves to hold and retain a flanged bushing 40 which provides a valve seat at that end of the housing 31.

Mounted on the end of the sleeve like extension 39 is a bonnet 41 provided with an outlet nipple 42 from which extends a pipe line 43 for a purpose to be presently explained.

Slidably mounted within the valve housing 31 is a valve member 45, shown detached in Fig. 4 of the drawings, the same comprising an elongated cylindrical portion 46 shaped at each end to provide valve faces 47 and 48, respectively, which are adapted to be alternatively seated, when operated as hereinafter set forth, on the valve seats provided by the flanged bushings 38 and 40 at the respective ends of the housing 31.

Intermediate the ends of the valve member 45 is an enlarged portion 49 constituting, in effect, a piston in which is provided, in an annular recess 50 therein, with a packing ring 51 to prevent passage of the air past said piston like portion 49.

The interior of the housing 31 is also provided, with an inwardly projecting annulus 52, in conjunction with which the cylindrical portion 46 of the valve member 45 is provided with a groove 53, in which a packing ring 54 is located, to prevent the passage of air past said annulus 52. The annulus 52 is positioned within the bore 30 of the valve housing 31, a sufficient distance from the piston portion 49 of valve member 45 to provide a central chamber 55 which is in communication with the exterior through a port 56.

The sleeve like extension 39, which is mounted on the end of the housing 31 remote from the inlet nipple 33, permits the mounting, in the valve structure, of a coil spring 57, one end of which is seated against a head or guide member 58, which is mounted on the end of an extension 59 which projects from the end of valve member 45 through the valve seat bushing 40.

The head or guide member 58 is provided with passageways 60 to permit the flow of the air from the interior of the valve housing 31, through the sleeve like extension 39 thereof to the outlet nipple 42 to which the pipe line 43 is connected.

The other end of the coil spring 57 bears against a ring member 61 which, as shown, is in turn seated on another ring member 62 of a similar size and shape. By substituting other ring members of different thicknesses, the tension of the coil spring may be adjusted to the desired pressure whenever it may be necessary to do so.

The valve housing 31 is also provided, intermediate its ends, with a projecting portion 63 through which passageways 64, 65 and 66 are bored. Certain of the holes, through which the tools are inserted for boring the aforesaid passageways, are closed by means of threaded plugs 67 and 68, whereas, one of said holes 69 is used for the connection therewith of a pipe 70 leading to a relief valve 71 to prevent damage to the valve 30 in the event of air becoming entrapped at abnormal pressure.

It will be noted that the valve member 45, in the absence of sufficient pressure in the reservoir tanks 11 and 12, will be impelled by the coil spring 57, to cause the valve face 47 of the valve member 45 to be seated on the flanged housing 38.

When the valve member 45 is in this position, air flowing from the compressor or pump will pass around the valve member 45 and through the passageways 64, 65 and 66 to the other end of the housing 31, and as the valve face 48 provided at that end will then be removed from its seat the air will flow through the flanged bushing, through the passageway 60 in the head member 58 and through the sleeve 39 to the outlet nipple 42.

When, however, the air brake system is functioning properly and the air in the reservoir tanks is of sufficient pressure to overcome the tension of the coil spring 57, the air from the compressor or pump will flow past the valve face 47 of the inlet end of the housing, thence through the flanged bushing 38 and through the nipple 35 to the pipe 36 connected thereto directly to the reservoir tank for normal use when required from time to time.

The pipe line 43 extends to a double acting check valve 72 to which one end of a pipe line 73 is also connected. The pipe line 73 extends from one of the reservoir tanks 11 or 12 of the tractor.

The check valve 72 is connected by pipe line 74 to the foot operated brake valve 15, and the foot operated brake valve 15 is connected by pipe line 75 to the tractor brakes 13 and 14, the arrangement being such that when the foot operated valve 15 is actuated the air will be permitted to flow through the pipe line 75 whether the same is supplied from the compressor 10 in the manner hereinbefore described, through the pipe line 43, or whether the brake system is functioning from a supply of air under proper pressure in the reservoir tanks 11 and 12 passing through the pipe line 73.

The pipe line 75 has connected thereto, by a pipe line 76, a stop light switch 77, of the usual type, and for the usual purpose.

A pipe line 78 extends from the pipe line 74 to the hand valve 16 for alternative operation of the brakes by said hand valve.

The foot operated brake valve 15 is connected by pipe line 79 to a double acting check valve 80 to which the hand valve 16 is also connected by pipe line 81.

The double acting check valve 80 is connected by pipe line 82 to the trailer coupling 83 by means of which it is connected to pipe line 28 which extends to the emergency relay valve 20 for the actuation of the trailer brakes 18 and 19.

Connected to the pipe 43, which extends from the outlet end of the automatic valve 30, is a pipe line 90 which is connected to a pressure regulating valve 91, which in turn is connected by pipe 92 to a double acting check valve 93, to which there is also connected a pipe 94, extending from pipe 73 which extends from one of the reservoir tanks 11 or 12 of the tractor to the double acting check valve 72 hereinbefore described.

The double acting check valve 93 is connected by pipe line 95 to trailer coupling 96, which is connected by pipe line 24 to the emergency relay valve 20 for the purpose of maintaining the supply of air in the trailer reservoir tank 17 for the actuation of the trailer brakes 18 and 19.

One of the reservoir tanks 11 or 12 has extending therefrom a pipe line 100 to which are connected, in the usual manner, the ordinary low pressure alarm 101, the pressure indicating gauge 102, and the governor 103 usually provided for causing the operation of the air compressor whenever the pressure in the reservoir tanks falls below a desired amount. The controlling pipe line 104 extends from the governor 103 to the air compressor 10 for that purpose.

The operation of the system, as hereinbefore described, should now be readily understood. If the vehicle has been standing for sometime, or if the air in the reservoir tanks is much below the normal pressure, the valve member 46 of the automatic valve 30 will be impelled by spring 57 to the position shown in Fig. 2 of the drawings, and the valve face 47 at the inlet end of the valve structure will be on its seat to close the pipe line 36 extending to the reservoir tanks 11 and 12. However, a relatively high pressure, upon starting the air compressor or pump 10, will be very quickly built up, within the interior of the valve 30, and in the pipe lines 43 and 90 connected to the outlet end thereof.

However, it should not be overlooked that the pressure regulating valve 91, to which pipe line 90 is connected, is of the nature of a choke valve, which will restrain the free flow of air from the compressor to the trailer piping so that the air in pipe line 43, which is controlled by the valve 15, will be available under sufficient pressure almost immediately after the compressor is started for application, if needed, to the tractor brakes 13 and 14.

If either the foot operated brake valve 15 or the hand operated valve 17 be now opened, the air coming directly from the compressor 10 under sufficient pressure for the purpose will be permitted to pass to the tractor brakes so that the operator will have some effective braking action almost immediately upon starting of the air compressor. When the pressure so obtained, bearing against the piston portion 49 of the valve member 46, becomes built up sufficiently to overcome the tension of the coil spring 57, the valve member 46 will be caused to move longitudinally within the housing 31, moving the valve surface 47 from its seat, whereupon some of the air will be permitted to pass through the pipe line 36 to the tractor reservoir tanks 11 and 12, and will start to build up the pressure therein.

On the other hand, so long as the valve surface 48 is not entirely seated, a certain amount of the air will pass through pipe line 90, through pressure regulating valve 91, through pipe line 92, check valve 93, pipe line 95, through the coupling 96, and thence through pipe line 24, to the emergency relay valve 20, and to the trailer reservoir tank 17. The pressure regulating valve 91 under such conditions will serve to determine the maximum pressure of the air supplied as aforesaid, to the trailer reservoir tank 17.

When the system is operating normally, the pressure in the trailer reservoir tank 17 will be maintained by the air flowing from the main reservoir tanks 11 and 12 to pipe 73, to pipe 94; thence through double acting check valve 93, pipe 95, trailer coupling 96, and pipe line 24 to the emergency relay valve 20, and thence through pipe 23 to the trailer reservoir tank 17.

If, however, there should be insufficient pressure in the reservoir tanks 11 and 12 for the proper operation of the brakes, after the compressor begins to operate and should there be no discharge or pressure drop in the system, by reason of the operation of the foot operated or hand operated brake valves, the air under pressure will pass initially to the trailer reservoir tank 17 and will continue to flow thereto until the air therein reaches the ordinary and proper operating pressure, after which the same will be available for application to the trailer brakes whenever the foot operated or hand operated brake valves 15 or 16 are operated for that purpose.

It will be seen that in the initial operation of the system, after it has been idle for sometime, or whenever the pressure in the main reservoir tanks 11 and 12 is below normal from any cause, the first action of the system will be to restore the pressure in the trailer reservoir tank 17 where it will be available for use in applying the brakes of the trailer. This is an important and valuable feature of the present invention, in that air under sufficient working pressure will quickly be made available for application to the trailer brakes, it of course being well known that it is sometimes dangerous to apply the tractor brakes without at the same time applying the trailer brakes, and also, under certain conditions, that it is preferable to apply the trailer brakes alone by the use of the hand valve 16, thereby preventing "jack-knifing" under certain conditions of operation.

After the pressure in the trailer reservoir tank 17 has been restored to normal, and the air compressor 10 is continued in operation through the usual and ordinary operation of the governor 103, and if no air is being used for brake application, by reason of the valve face 47 being moved from its seat on the flange or bushing 38, the air will flow through pipe line 36 to the main reservoir tanks 11 and 12 until the pressure therein is restored and brought up to normal.

In the normal operation of the system with the proper pressure in the reservoir tanks, the tension of the coil spring 57 will be overcome by the pressure in the tank acting backwardly through the pipe line 36, and the valve face 47 will be held away from its seat, so that the supply of air from the compressor will then pass directly into the reservoir tanks 11 and 12, and, if called for, to the reservoir tank 17 of the trailer through the pipe line, etc., extending from the reservoir tank 12 to said reservoir tank 17. Under such conditions the brake system will function in the ordinary manner as if the automatic valve 30 were not employed.

I claim:

1. In an air brake system for automotive vehicles including an air compressor, a reservoir tank, air operated brakes, manually operable means for controlling the flow of air for the operation of said brakes, and automatic valve means for permitting the actuation of said brakes by direct flow of air under pressure from the compressor and for restoring the normal operating pressure in said reservoir tank, said automatic valve including a slidably mounted valve member having a valve surface at each end thereof, the valve member having an enlarged piston portion, means for applying air from the compressor to said piston portion to impel the valve member in one direction tending to seat the valve surface at the outlet end of the valve structure, a spring impelling the valve member in the other direction to seat the valve surface at the inlet end of the valve structure, a connection from the inlet end of the valve structure to the reservoir tank, and a connection from the outlet end of the valve structure to the means for controlling the flow of the air to the brakes.

2. In an air brake system for automotive vehicles including an air compressor, a reservoir tank, air operated brakes, manually operable means for controlling the flow of air for the operation of said brakes, and an automatic valve for permitting the actuation of said brakes by direct flow of air under pressure from the compressor and for restoring the normal operating pressure in the reservoir tank, said automatic valve comprising a housing having an internal bore, a valve member slidably mounted within said housing and having a valve surface at each end thereof, the valve member having an enlarged piston portion intermediate its ends, an inlet for air from the compressor under pressure at one end of the valve structure, a connection to the reservoir tank extending from the inlet end of the valve housing, a spring impelling the valve member in a direction to seat the valve at the inlet end of the valve structure, the valve housing having a bypass passage between the end portions of the interior of the housing, and the interior of the housing having an annulus subdividing the interior of the housing between the piston portion of the valve member and the outlet end of the housing thereby providing an intermediate chamber between said annulus and said piston portion, the housing having a port extending from said intermediate chamber to the exterior, and a connection from the outlet end of the automatic valve structure to the operating valves for the control of the brakes.

3. In an air brake system for automotive vehicles of the tractor trailer type including an air compressor, a reservoir tank for the tractor, air operated brakes on the tractor, a reservoir tank for the trailer, air operated brakes on the trailer, manually operable means for controlling the flow of air for the operation of said brakes, and an automatic valve for permitting the actuation of the tractor brakes by direct flow of air under pressure from the compressor and for restoring the normal operating pressure in the reservoir tanks, said automatic valve including a slidably mounted valve member having a valve surface at each end thereof, the valve member having an enlarged piston portion, means for applying air from the compressor to said piston portion to impel the valve member in one direction to seat the valve at the outlet end of the valve structure, a spring impelling the valve member in the other direction to seat the valve at the inlet end of the valve structure, a connection from the inlet end of the valve structure to the tractor tank, and a connection from the outlet end of the valve structure to the operating valves for the control of the brakes and to the trailer reservoir tank.

4. In an air brake system for automotive vehicles of the tractor trailer type including an air compressor, a reservoir tank for the tractor, air operated brakes on the tractor, a reservoir tank for the trailer, air operated brakes on the trailer, manually operable means for controlling the flow of air for the operation of said brakes, and an automatic valve for permitting the actuation of the tractor brakes by direct flow of air under pressure from the compressor and for restoring the normal operating pressure in the reservoir tanks, said automatic valve comprising a housing having an internal bore, a valve member slidably mounted within said housing and having a valve surface at each end thereof, the valve member having an enlarged piston portion intermediate its ends, an inlet for air from the compressor under pressure at one end of the valve structure, a connection to the tractor reservoir tank extending from the inlet end of the valve housing, a spring impelling the valve member in a direction to seat the valve at the inlet end of the valve structure, the valve having a bypass passage between the end portions of the interior of the housing, and the interior of the housing having an annulus subdividing the internal bore between the piston portion of the valve member and the outlet end of the housing thereby providing an intermediate chamber between said annulus and said piston portion, the housing having a port extending from said intermediate chamber to the exterior, and a connection from the outlet end of the valve structure to the operating valves for the control of the brakes and to the trailer reservoir tank.

References Cited in the file of this patent

UNITED STATES PATENTS

| | | |
|---|---|---|
| 2,240,166 | Stanley | Apr. 29, 1941 |
| 2,289,491 | Fitch | July 14, 1942 |
| 2,317,194 | Humphrey | Apr. 20, 1943 |
| 2,441,050 | Wregers | May 4, 1948 |